United States Patent [19]

Deem et al.

[11]  4,064,973
[45]  Dec. 27, 1977

[54] ACTUATING AND ADJUSTING MECHANISM FOR DISC BRAKES

[75] Inventors: Brian Charles Deem; Matthew Edward Markert; Bruce Earl Latvala, all of Elyria, Ohio

[73] Assignee: The Bendix Corporation, South Bend, Ind.

[21] Appl. No.: 742,802

[22] Filed: Nov. 18, 1976

[51] Int. Cl.$^2$ ............................................. F16D 65/38
[52] U.S. Cl. .................................. 188/71.7; 188/71.9; 188/72.7; 188/196 C; 192/70.23; 192/70.25; 192/111 R
[58] Field of Search ............... 188/72.7, 71.7, 71.9, 188/196 BA, 196 M, 196 C; 192/70.23, 70.25, 111 R, 111 A

[56]  References Cited
U.S. PATENT DOCUMENTS

| 2,012,011 | 8/1935 | Keller | 188/196 M X |
|---|---|---|---|
| 2,669,327 | 2/1954 | Chamberlain et al. | 188/71.9 |
| 3,356,193 | 12/1967 | Stowers | 188/71.9 X |
| 3,362,506 | 1/1968 | Mossey | 74/110 X |
| 3,547,229 | 12/1970 | Pollinger et al. | 188/72.7 X |
| 3,709,333 | 1/1973 | Buyze | 188/71.9 |
| 3,966,028 | 6/1976 | Anderson et al. | 188/71.9 X |
| 3,967,705 | 7/1976 | Johannesen et al. | 188/71.9 |

FOREIGN PATENT DOCUMENTS 1,016,564  1/1966  United Kingdom ............... 188/71.9

*Primary Examiner*—George E. A. Halvosa
*Attorney, Agent, or Firm*—Ken C. Decker; William N. Antonis

[57]  ABSTRACT

A mechanically actuated disc brake includes a wedge actuator which urges an extensible, force transmitting member toward the disc brake rotor in order to effect a brake application. A ratchet mechanism is carried by the extensible member and by a piston slidably mounted within the brake housing. The ratchet mechanism is responsive to movement of the extensible member toward the rotor in access of a predetermined amount in order to effect elongation of the extensible member to limit retraction in the piston, so that retraction of the friction elements is similarly limited. The extensible member also cooperates with a manual adjustment mechanism which may be used to manually adjust the brakes or to "back-off" the extensible member to permit movement of the friction elements away from the disc in excess of the predetermined amount when the friction elements must be removed when the brake is serviced. The wedge actuating mechanism includes a pair of wedges and a reciprocable push rod which is thrust between the wedges to urge the latter apart when a brake application is effected.

9 Claims, 3 Drawing Figures

ACTUATING AND ADJUSTING MECHANISM FOR DISC BRAKES

BACKGROUND OF THE INVENTION

This invention relates to a mechanical actuating and automatic adjustment mechanism for use in a heavy duty disc brake.

Until now, most disc brakes have been hydraulically actuated and have been used mainly in passenger cars and light trucks. However, because of Government safety regulations and the inherent advantages of disc brakes, heavy duty air braked vehicles are expected to be equipped with air actuated disc brakes in the near future. Since air actuated disc brakes normally incorporate some type of mechanical actuator to transmit and multiply actuation forces generated by the air pressure actuator so that the friction elements used in the disc brake may be urged into braking engagement with the rotor with sufficient force to effort a brake application, and since these mechanical actuators normally have a very limited stroke, it is necessary to provide automatic adjustment mechanisms which effect a brake adjustment to limit reaction of the friction elements to a predetermined amount which is always within the stroke capabilities of the mechanical actuator. In actuators incorporating a wedge actuating mechanism of the type disclosed herein, it is critical that the wedges used in the wedge actuator be maintained in alignment. For this reason, prior art actuators required a fairly complicated manufacturing process to ensure alignment of the wedges and to prevent relative rotation of one of the wedges with respect to the housing.

SUMMARY OF THE INVENTION

The present invention relates to an air actuated disc brake including a mechanical mechanism which transfers the brake actuating forces from the air pressure responsive fluid motor to the friction elements. The mechanical mechanism includes an automatic adjustment mechanism and also a manual adjustment mechanism, so that the brake is automatically adjusted during normal operation of the vehicle braking system, but may be manually adjusted when this is desirable, such as when the brake is serviced.

Therefore, an important object of our invention is to provide a manual and automatic adjustment mechanism for an air pressure actuated disc brake which effects adjustment of the brake automatically during normal operation thereof, but which also provides a manual adjusting capability to effect manual adjustment when necessary and to "back-off" the adjuster to permit easy removal of the friction elements when the brake is serviced.

Still another important object of our invention is to provide a wedge actuator for an air pressure actuated disc brake in which the wedge actuator mechanism inherently maintains alignment of the wedges so that auxiliary devices to maintain alignment of the wedges are not necessary.

DETAILED DESCRIPTION

Figure 1:
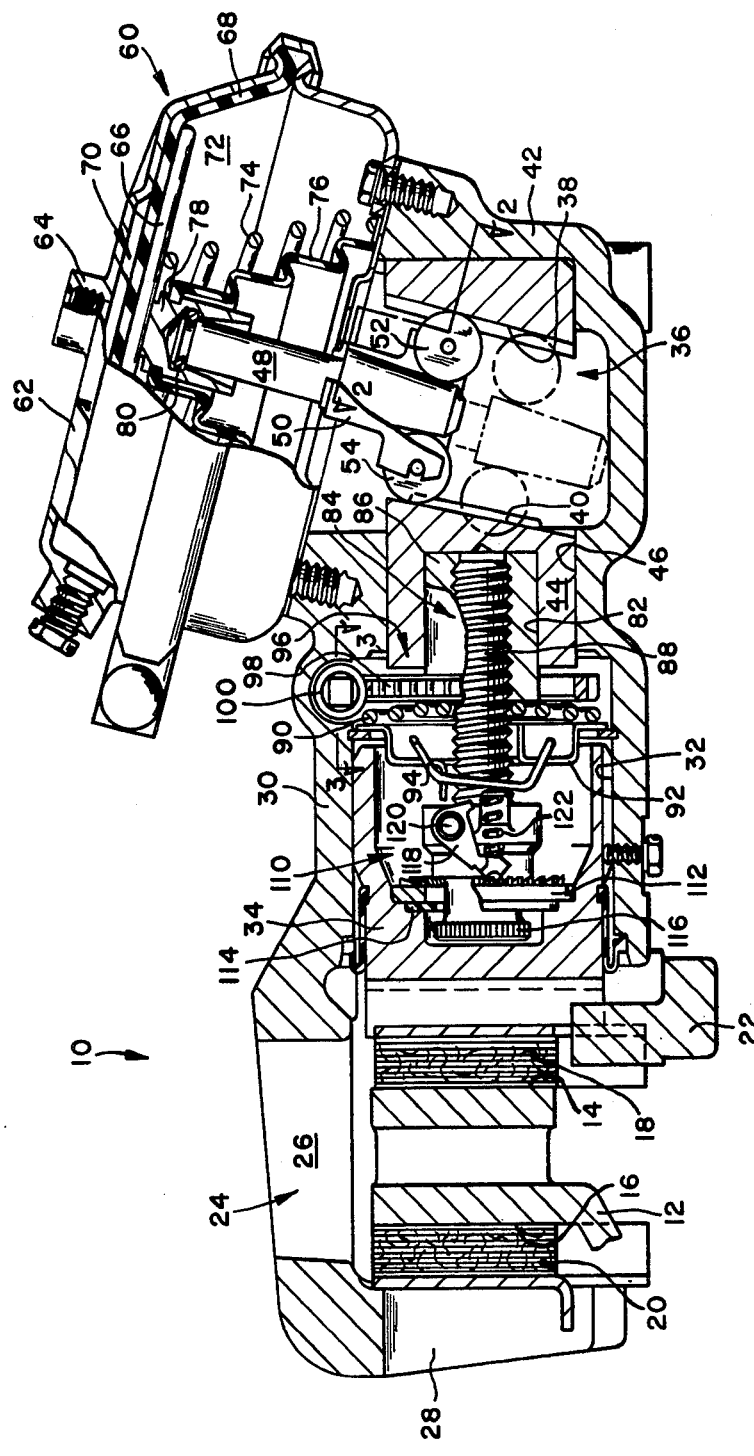
FIG. 1 is a longitudinal cross-sectional view of a disc brake assembly made pursuant to the teachings of our present invention.

Referring now to the drawings, a disc brake assembly generally indicated by the numeral 10 includes a rotor 12 having a pair of opposed friction faces 14 and 16. A pair of friction elements 18, 20 are disposed adjacent each of the friction faces 14, 16 respectively and are adapted to frictionally engage the latter when a brake application is effected. A torque member 22 is rigidly secured to a nonrotating portion of the vehicle on which the disc brake 10 is mounted, and a caliper assembly generally indicated by the numeral 24 includes a bridge portion 26 which extends across the periphery of the rotor 12, an inwardly extending portion 28 which carries the friction element 20, and a housing 30 which extends adjacent the friction face 14 of the rotor 12 and which engages the friction element 18. The housing 30 defines a bore 32 therewithin which slidably receives a piston 34 which is adapted to engage the friction element 18 to urge the latter into braking engagement with friction face 14.

A wedge actuating mechanism generally indicated by the numeral 36 is also located within the housing 30 and includes a pair of complementary wedge elements 38, 40. The wedge element 38 is rigidly secured to the end 42 of the housing 30, and the wedge element 40 includes a body 44 which is slidably mounted in the portion 46 of the bore 32. A push rod 48 is adapted to be thrust between the wedges 38, 40 when a brake application is effected. The push rod 48 carries a roller carrier 50 which in turn mounts a pair of rollers 52, 54.

For maximum force output with rolling action, the included wedge angles must be at least 7°. In prior art mechanisms, the included wedge angle is obtained by providing equal wedge angles on the push rod, and the remaining angle is divided equally between the other two wedge surfaces. In the mechanism illustrated in FIG. 1, a more compact package and minimized push rod travel is obtained by tilting the actuator 15°. The included angle of 9° is attained by providing two equal wedge angles of 2½° each on the push rod 48, a 1° angle on the wedge element 38, and a 3° angle on the wedge 40.

Figure 2:
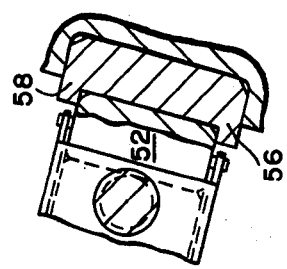
FIG. 2 is a fragmentary cross-sectional view taken substantially along lines 2—2 of FIG. 1.
Figure 3:
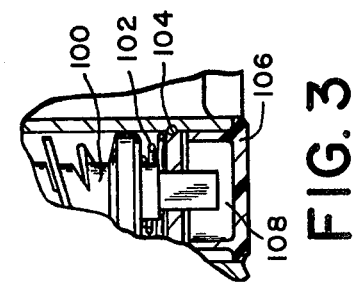
FIG. 3 is a fragmentary, cross-sectional view taken substantially along lines 3—3 of FIG. 1.

As is best illustrated in FIG. 2, the wedges 38, 40 include detents, for example, the detents 56, 58 on the wedge 38, which define rails to embrace the ends of the rollers 52, 54 so that the latter are guided as they travel along the wedges. Since the rollers are embraced by the detents on both of the wedge elements, the movable wedge element 40 is prevented from rotating relative to the housing by the push rod 48 and carrier assembly 50. The push rod 48 and carrier assembly 50 are similar to conventional actuating mechanisms for wedge-actuated drum brakes.

As illustrated by the dashed lines in FIG. 1, the roller carrier 50 moves with the push rod 48 until a predetermined force level is attained whereupon the push rod 48 moves relative to the rollers 52, 54 urging them a small distance additional apart. The portion of the stroke of the push rod 48 in which the carrier 50 does not move relative to the push rod 48 corresponds to the stroke required to take up the clearance between the friction elements and the rotor and the portion of the stroke of the push rod 48 relative to the roller carrier 50 and the rollers 52 and 54 represents the portion of the stroke wherein the friction elements are engaged with the friction faces 14 and 16 and the relative movement of the push rod exerts a very high force level necessary to effect a brake application. Since the push rod 48, roller carrier 50 and the rollers 52, 54 are conventional, they will not be described in further detail herein. The push rod 48 is actuated by a fluid motor assembly generally indicated by the numeral 60. The fluid motor 60 includes a housing 62 which includes an inlet 64 which is communicated to an air pressure source when a brake application is effected. A diaphragm 68 is mounted within the housing 62 and divides the latter into chambers 70 and 72. The inlet port 64 communicates with the chamber 70. The chamber 72 houses a pressure plate 66 and a return spring 74 which urges the pressure plate towards the brake release position illustrated in the drawings. A flexible boot 76 prevents contaminants in the chamber 72 from entering the bore 30 and interfering with the wedge actuating mechanism 36. The push rod 48 is secured to the pressure plate 66 by a socket 78 which receives the end of the push rod 48 and a C-ring 80 which provides an interference fit between the socket and the push rod so that the push rod cannot separate from the socket 78.

As discussed hereinabove, the body 44 is slidably mounted in the portion 46 of the bore 32. Body 44 defines a bore 82 which slidably receives one end of an extensible force transmitting member generally indicated by the numeral 84. The force transmitting member 84 includes components 86, 88 which are threadedly interconnected so that upon relative rotation of the components, the component 88 will either extend from, or retract into, the component 86, depending upon the direction of relative rotation between the components. A spring 90 yieldably urges the extensible member 84 and the body 44 which carries the wedge 40 to the right viewing FIG. 1, toward the brake release position. The spring retainer 92 frictionally engages the housing and carries a drag spring 94. Drag spring 94 frictionally engages the threads on the component 88 of the extensible member 84, and prevents rotation of the component 88 until a predetermined force is exerted upon it. The drag spring 94 prevents inadvertent rotation of the component 88 due to vibration and due to backlash in the adjustment mechanism which will be described hereinafter. If excessive adjustment forces are exerted during a manual adjustment, the frictional engagement between the spring retainer 92 and the housing yields before the manual adjuster is damaged.

The disc brake 10 is provided with a manual adjustment mechanism generally indicated by the numeral 96 which includes a spur gear 98 which is integral with the component 86 and slides therewith axially with respect to the housing 30 when the brake is actuated. Spur gear 98 meshes with a worm 100 which is mounted in a cross bore 102 defined within the housing 30. To permit the worm to accommodate the sliding movement of the spur gear 98, the worm is permitted to slide within the bore 102, but centering springs 104 yieldably urge the worm to a centered position within the bore. Removable covers 106 protect the ends 108 of worm 100 from contaminants. Ends 108 are adapted to receive an appropriate tool for rotating the worm 100.

An automatic adjustment mechanism generally indicated by the numeral 110 includes a toothed ring 112 which is secured to the piston 34 and which also retains a resilient washer 114 on the piston 34. The component 88 extends through the toothed ring 112 and terminates in an enlarged head 116 which is adapted to engage the resilient washer 114 on operation of the manual adjustment mechanism 96 to force the piston 34 to the right viewing FIG. 1 when the adjustment mechanism is "backed-off." The automatic adjustment mechanism 110 further includes a pawl 118 which is pivotally carried by the component 88 by a pivot pin 120. A spring 122 yieldably urges the head of the pawl into engagement with one of the teeth on the toothed ring 112.

MODE OF OPERATION

When a brake application is effected, fluid pressure from the appropriate source is communicated through the inlet 64 into the chamber 70 where it reacts on the diaphragm 68 to move the pressure plate 66 downwardly viewing the figure. Movement of the pressure plate 66 downwardly urges the push rod 48 downwardly so that this downward movement moves the wedge 40 to urge the friction element 18 into braking engagement with the friction face 14, and, because of the slidable connection between the caliper and the fixed support 22, reaction forces transmitted through the bridge 26 to the inwardly extending portion 28 will also urge the friction element 20 into braking engagement with the friction face 16. After the friction elements 18 and 20 are in frictional engagement with the respective friction faces, the wedge actuator push rod 48 moves relative to the rollers 52, 54 spreading them a slight small additional amount, to develop the very high braking forces necessary to effect a brake application. Movement of the wedge 40 is transmitted to the friction element 18 through the body 44, the extensible force transmitting member 84, and the piston 34 due to engagement of the head 116 with the rear face of the piston, to thereby provide a direct mechanical link between the friction element 18 and the wedge 40. Upon release of the brake, the return springs 74 and 90 urge the various components into the positions illustrated in the drawings. When this occurs, the spring 122 also urges the head of the pawl 118 into engagement with one of the teeth of the toothed ring 112. If wear of the friction elements 18, 20 has required an adjustment, the head of the pawl 118 will pick up the next tooth on the ring relative to the one that it was engaged with prior to the brake application. Upon a subsequent brake application, relative axial movement between the force transmitting member 84 and the piston 34 to take up excessive clearance between the head 116 of the component 88 and the piston will cause the pawl to rotate the component 88 in a direction extending it from the component 86. This elongates the extensible member 84, thereby preventing retraction of the piston 34 by more than a predetermined amount, to maintain a relatively tight running clearance between the friction elements 18, 20 and the friction faces 14, 16.

However, there are instances when it is desirable to be able to manually effect extension or retraction of the extensible member 84. These situations most often arise when the friction elements 18, 20 have been so worn that they must be replaced. Because of the relatively tight running clearance between the friction elements and the corresponding friction faces, it is necessary to "back-off" the adjustment mechanism to increase the running clearance between the friction elements and the friction faces so that the friction elements may be removed. As discussed hereinabove, the spur gear 98 is integral with the component 86 of the extensible member 84 and moves axially therewith when a brake application is effected, the worm 100 meshing with the spur gear 98 and being slidable in the bore 102 to accommodate this axial movement of the spur gear 98. When the adjuster is to be "backed-off" the dust cover 106 is removed and the appropriate tool is placed on the end 108 of worm 100 and the latter is rotated to rotate the spur gear 98 in a direction whereby the resultant rotation of the component 86 retracts the component 88. When the component 88 is retracted by operation of the worm 100, the head 116 engages the flexible washer 114 so that retraction of the component 88 also forces the piston 34 to the right viewing FIG. 1. This allows the friction elements 18 and 20 to be removed and allows the distance between the end of the piston and rotor to be increased so that new friction elements, with new unworn lining, may be placed in the brake assembly. After the brake is serviced, it is also desirable to quickly take up as much of the excess clearance between the friction elements 18, 20 and the friction faces 14, 16 as possible. When this is done, the worm 100 is rotated in the opposite direction, thereby rotating the component 86 in the direction extending the component 88 from the component 86 to take up this clearance. The drag spring 94, of course, does exert a frictional restraining force on the component 88, but the force exerted between the pawl 118 and the tooth ring 112 during an automatic brake adjustment is much more than enough to overcome the relatively small frictional drag provided by the spring 94. However, this friction drag is sufficient to prevent backlash upon release of the brakes when the adjuster pawl 118, for example, moves to engage a new tooth from "backing-off" the adjuster accidentally. Furthermore, the relatively small frictional drag exerted by the drag spring 94 may be easily overcome by the aforementioned appropriate tool rotating the worm 100.

We claim:
1. In a disc brake, a rotor having a pair of friction faces, a pair of friction elements disposed adjacent each of said friction faces, a torque member mounted adjacent said rotor, a caliper slidably mounted on said torque member and straddling said rotor for urging said friction elements into frictional engagement with said friction faces when a brake application is effected, said caliper including a housing, actuating means carried by said housing, said actuating means including an extensible force-transmitting member slidably mounted in said housing and movable therein in a direction generally parallel to the axis of rotation of the rotor, one end of said extensible member being adapted to operably engage one of said friction elements for transmitting brake actuation forces to the latter when a brake application is effected and to limit retraction of the one friction element when the brake is released, means engaging the other end of said member for urging the latter toward the rotor when a brake application is effected, automatic adjustment means responsive to movement of said extensible member in excess of a predetermined amount to extend said extensible member and thereby limit retraction of said friction element to said predetermined amount, and manual adjustment means for extending said extensible member to thereby effect a manual adjustment and for retracting said extensible member to allow the friction elements to move away from said rotor a distance greater than said predetermined amount when the brake is serviced, said extensible member including a pair of coaxial, relatively rotatable components arranged so that one of said components extends from, or retracts into, the other component upon relative rotation between said components, and a piston adapted to be engaged by one end of said one component to provide a force transmitting back to one of said friction elements when a brake application is effected, said automatic adjustment means including a ratchet mechanism carried by said one component and by said piston for effecting rotation of the one component in a direction extending it from the other component when an automatic adjustment of said brake is effected, said manual adjustment means including gearing means for rotating said other component upon rotation of the gearing means, and means frictionally engaging the wall of said housing and engaging said one component, said frictionally engaging means yielding when the force applied to the manual adjusting means attains a level sufficient to overcome the frictionally engaging force between the housing and the frictionally engaging means to prevent damage to the manual adjusting means.

2. The invention of claim 1, and
a wedge actuator for urging said extensible member toward said rotor, said wedge actuator including a front wedge slidably mounted in said housing and engaging said extensible member, a rear wedge fixed to said housing, a push rod carried by said housing for reciprocation between said front and rear wedges, and means carried by said push rod for forcing said front wedge away from said rear wedge, as the push rod is therebetween.

3. The invention of claim 2,
said front wedge including a member defining a cavity receiving one end of said extensible member, said manual adjusting means including means rotating said one end of said extensible member.

4. The invention of claim 1,
said ratchet mechanism being a ring having ratchet teeth circumscribing said one component and a spring loaded lever for engagement with the teeth of said ring.

5. The invention of claim 1,
said gearing means including a spur gear fixed to said other component and slidable therewith and a worm secured against sliding movement with said spur gear but meshing with said spur gear for rotating the latter upon rotation of the worm.

6. The invention of claim 5, and
resilient means yieldably urging said worm toward a predetermined position in said housing.

7. The invention of claim 1, and
said frictionally engaging means including yieldable drag means engaging said one component to exert a frictional torque thereon to resist rotation of said one component to resist retraction of said extensible member.

8. The invention of claim 1, and
a piston return washer carried by said piston, said extensible member engaging said piston return washer upon movement of said extensible member away from the rotor so that said piston is pulled away from the rotor with said extensible member.

9. The invention of claim 1, and
yieldable means yieldably urging said extensible member away from said rotor so that the extensible member is urged away from the rotor upon brake release.

* * * * *